Figure 1:
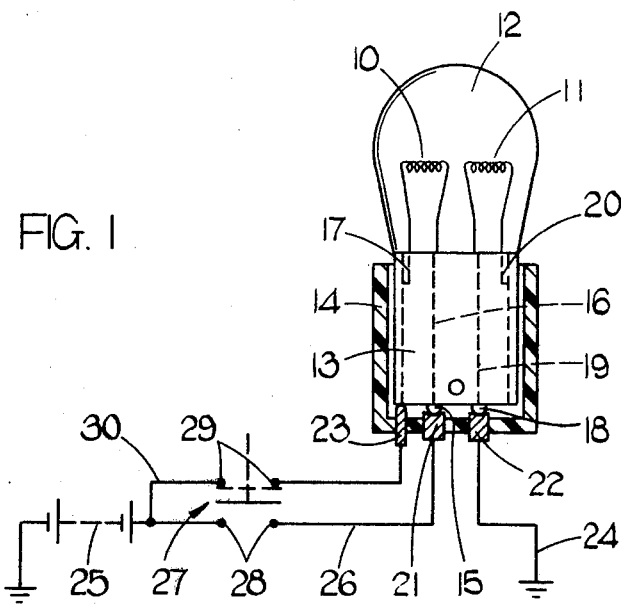

United States Patent [19]

Green

[11] 3,958,149

[45] May 18, 1976

[54] MOTOR VEHICLE REAR LIGHTING SYSTEM

[75] Inventor: Stanley Green, West Midlands, England

[73] Assignee: The Lucas Electrical Company Limited, Birmingham, England

[22] Filed: Apr. 30, 1975

[21] Appl. No.: 573,257

[30] Foreign Application Priority Data

May 28, 1974 United Kingdom............... 23632/74

[52] U.S. Cl................................... 315/66; 315/67; 315/69; 315/77
[51] Int. Cl.² ........................................ H01J 7/44
[58] Field of Search .................. 315/64, 66, 67, 69, 315/77

[56] References Cited
UNITED STATES PATENTS

| | | | |
|---|---|---|---|
| 3,244,934 | 4/1966 | Webb.................................. | 315/77 |
| 3,349,280 | 10/1967 | Siiberg................................ | 315/77 |
| 3,638,068 | 1/1972 | Wilson............................... | 315/77 X |

Primary Examiner—James B. Mullins
Attorney, Agent, or Firm—Holman & Stern

[57] ABSTRACT

A motor vehicle rear lighting system comprises first and second lamp filaments in a single bulb envelope, the first lamp filament having a greater resistance than that of the second lamp filament. One or more electrical switches are operable, in one position, to connect the lamp filaments in series with a battery, and, in another position, to complete the circuit from the battery to the second lamp filament without the first lamp filament in series therewith. The arrangement is such that, in said one position of the one or more switches, the first lamp filament becomes luminous and, in said another position of the switch means, the second lamp filament becomes luminous. In one embodiment, a first lamp filament by-pass is provided and, in said another position of the electrical switch, the circuit to the second lamp filament is completed via the by-pass. In another embodiment, the electrical switches are arranged to connect the lamp filaments in parallel when the switches are in their said another position.

4 Claims, 2 Drawing Figures

U.S. Patent   May 18, 1976   3,958,149

MOTOR VEHICLE REAR LIGHTING SYSTEM

This invention relates to a motor vehicle rear lighting system which can be operated at normal intensity under normal conditions or at increased intensity under foggy conditions.

According to the present invention, there is provided a motor vehicle rear lighting system comprising first and second lamp filaments, the first lamp filament having a greater resistance than that of the second lamp filament, and electrical switch means operable, in one position, to connect the lamp filaments in series with a supply, and, in another position, to complete the circuit from the supply to the second lamp filament without the first lamp filament in series therewith, the arrangement being such that, in said one position of the switch means, the first lamp filament becomes luminous and, in said another position of the switch means, the second lamp filament becomes luminous.

In one embodiment, a first lamp filament by-pass is provided and, in said another position of the electrical switch means, the circuit to the second lamp filament is completed via the by-pass.

In another embodiment, the electrical switch means is arranged to connect the lamp filaments in parallel when the switch means is in its said another position.

The switch means may comprise one or more electrical switches.

Preferably, both filaments are disposed in a single bulb envelope.

Preferably also, the filaments are electrically connected by an electrically conductive body of a bulb of which the single bulb envelope forms part.

Figure 2:
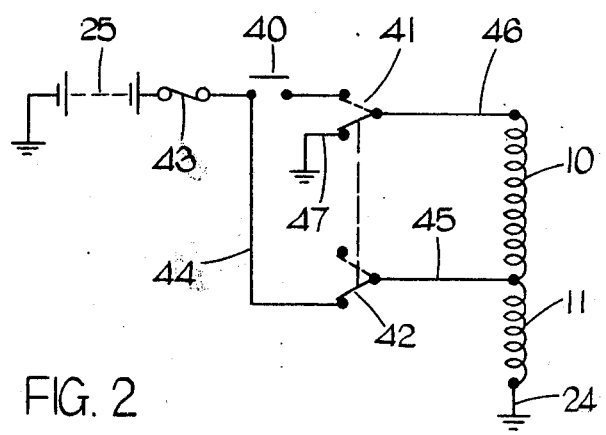

Embodiments of the present invention will now be described, by way of example, with reference to the accompanying drawing in which:

FIG. 1 is a schematic illustration of a motor vehicle rear lighting system according to the present invention, and FIG. 2 is a schematic illustration of an alternative motor vehicle rear lighting system, also according to the present invention.

Referring to FIG. 1 of the drawing, the lighting system is intended to be used at the rear of the motor vehicle to provide one of the rear tail lights thereof. The arrangement is such that, at the discretion of the driver of the vehicle, the rear tail lights can be illuminated at normal intensity for ordinary night driving or at increased intensity for driving under foggy or misty conditions.

The lighting system comprises first and second lamp filaments 10 and 11 which are disposed in a single glass envelope 12 of a bulb. The bulb has an electrically conductive body 13 which is engaged in bayonet fashion with an electrically insulating, plastics bulb holder 14. The first filament 10 is rated at 5 watts and has a greater electrical resistance than the second filament 11 which is rated at 21 watts. One end of filament 10 is electrically connected to a first contact 15 via a conductor 16 whilst the other end of the filament 10 is connected by way of a conductor 17 with the body 13. The second filament 11 is connected at one end with a second contact 18 via a conductor 19, whilst its other end is electrically connected with body 13 via a further conductor 20. The first and second contacts 15 and 18 and the body 13 are respectively engaged by terminals 21, 22 and 23 in the bulb holder 14. The second contact 22 is connected to earth by way of a line 24. The first contact 21 is connected with one side of a battery 25 via a line 26 and a three-position switch 27. The other side of the battery 25 is connected to earth. The switch 27 is manually operable and is movable between a central, off position and a pair of "on" positions. In one "on" position of the switch 27, contacts 28 connected with the line 26 are closed so that the first filament 10 is connected with battery 25. In the other "on" position of switch 27, contacts 29 in a first filament by-pass line 30 are closed. In the first mentioned "on" position, a circuit is completed with battery 25 via line 26, terminal 21, contact 15, conductor 16, filament 10, conductor 17, body 13, conductor 20, filament 11, conductor 19, contact 18, terminal 22, and line 24. The battery 25 is a conventional 12 volt motor vehicle battery and the ratings of the filaments 10 and 11 are such that a current flows through the circuit which is sufficient only to render filament 10 luminous. It will, however, be appreciated that the light output from filament 10 in the above described circuit will be rather less than that from filament 10 if filament 11 were not included in the circuit.

In the second mentioned "on" position of switch 27, a circuit to battery 25 is completed via line 30, terminal 23, body 13, conductor 20, filament 11, conductor 29, contact 18, terminal 22 and line 24. In other words, filament 10 is bypassed and the current flowing is sufficient to render filament 11 luminous. Because of the respective ratings of filament 10 and 11, the light output from filament 11 is much higher than the output from filament 10.

Thus, in the first mentioned "on" position of switch 27, the rear lamp is suitable for use in ordinary night driving, whilst in the second "on" position of the switch 27, the rear side light has a sufficiently high intensity output to be used under foggy conditions.

Referring now to FIG. 2 of the drawing, the system illustrated therein is similar to that of FIG. 1 and similar parts are accorded the same reference numerals.

In this embodiment, instead of one 3-position switch 27, three 2-position switches 40, 41 and 42 are provided, switches 41 and 42 being ganged together for simultaneous operations.

With the switches 41 and 42 in the positions shown in FIG. 2, a circuit is completed through both filaments 10 and 11 in parallel from battery 25 via a fuse box 43, a line 44, switch 42, a line 45, and line 24 in the case of filament 11, and a line 46, switch 41 and a line 47 in the case of filament 10.

When the switches 41 and 42 are moved into the position shown in dotted line in FIG. 2 and switch 40 is closed, a circuit is completed via fuse box 43, switch 40, switch 41, line 46, filaments 10 and 11, and line 24. In this position, the filaments 10 and 11 are connected together in series and the arrangement is the same as in the embodiment of FIG. 1 wherein only filament 10 rendered luminous and the illumination is at reduced intensity because of the presence of filament 11.

It will be manifest that, in the first-described positions of switches 41 and 42, both of filaments 10 and 11 will be illuminated for use under foggy conditions. This, of course, differs from the embodiment of FIG. 1 wherein only filament 11 is illuminated under foggy conditions.

The advantages of the above-described lighting systems are as follows:

1. A high intensity lamp suitable for use under foggy conditions can be incorporated easily into a lamp cluster at the rear of the motor vehicle, such lamp cluster normally including a tail light, a brake light, and a direction indicator light.

2. A commercially available double filament bulb which is conventionally used for brake and tail lights can be employed, and 3. The bulb filament can be used in conjunction with a conventional form of lens cover which is normally used in a conventional type of high intensity rear lamp used under foggy conditions. Such a conventionally available lens cover is extremely efficient and would normally provide too great a light output when used with a conventionally wired tail lamp filament rated at 5 watts. However, since the tail lamp filament (first filament 10) is only connected in circuit with the battery 25 via filament 11, a reduced output is obtained therefrom so that the overall light output from the tail light falls within acceptable limits.

I claim:

1. A motor vehicle rear lighting system comprising a light bulb having an electrically conductive body, first and second filaments mounted in said bulb, first and second contacts on the bulb, one end of said first filament being connected with said electrically conductive body, an opposite end of said first filament being connected to said first contact, one end of said second filament being connected with said electrically conductive body, an opposite end of said second filament being connected with said second contact, an electrical source, and an electrical switch means movable between one position and another position, said electrical switch means being connected in a circuit with the source and the bulb so that, in said one position, said supply is connected with said first contact and, in said another position, said supply is connected with said electrically conducting body of said bulb, said circuit being completed in both of said positions of said switch means by way of said second contact so that, in said one position of said switch means, said filaments are connected in series with said supply and said first filament becomes luminous, and, in said another position of said switch means, said circuit is completed from said supply to said second lamp filament without said first lamp filament in series therewith.

2. The system according to claim 1, wherein a first filament by-pass is provided and, in said another position of said switch means, said circuit to said second filament is completed by way of said by-pass.

3. The system according to claim 1, wherein said switch means, in its said one position, connects said supply with said first contact, said circuit being completed via said second contact and, in said another position, said switch connects said supply with said electrically conductive body of said body and also connects said first contact so that said circuit is completed by way of both of said contacts whereby said filaments are connected together in parallel.

4. The system according to claim 3, wherein said switch means comprises more than one electrical switch.

* * * * *